Sept. 23, 1952  L. H. RUMBAUGH ET AL  2,611,803
METHOD AND APPARATUS FOR CONDUCTING GEOPHYSICAL SURVEYS
Filed July 10, 1946  3 Sheets-Sheet 1

Inventors
L. H. RUMBAUGH
H. JENSEN
J. R. BALSLEY, JR.

By M. O. Hayes
Attorney

Sept. 23, 1952   L. H. RUMBAUGH ET AL   2,611,803
METHOD AND APPARATUS FOR CONDUCTING GEOPHYSICAL SURVEYS
Filed July 10, 1946   3 Sheets-Sheet 2
FIG. 2.
FIG. 3.
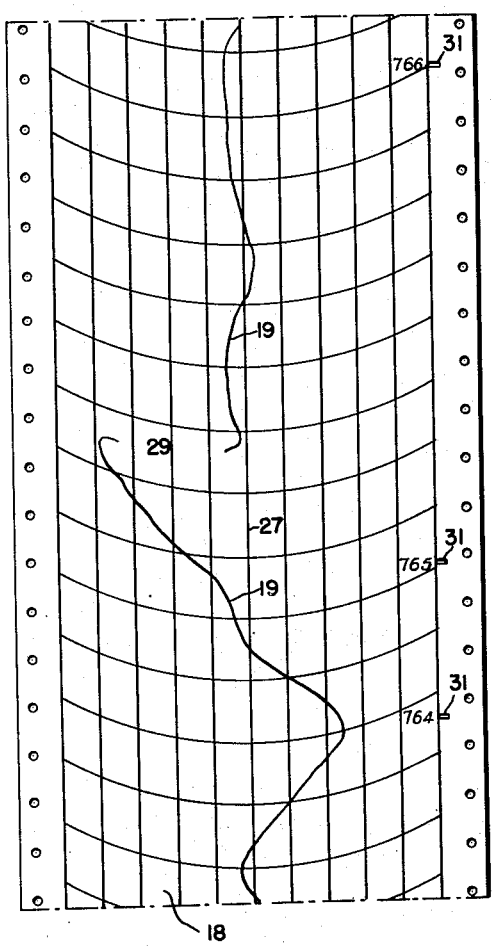
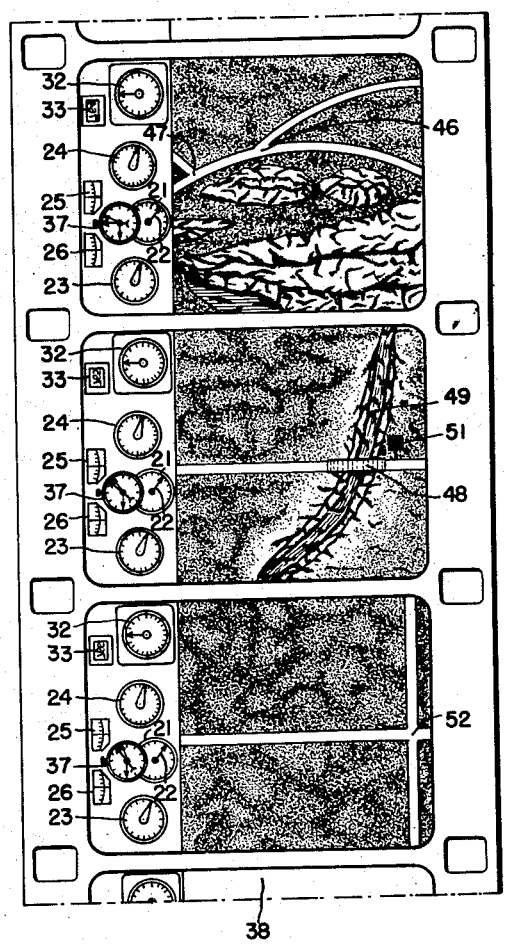
Inventors
L. H. RUMBAUGH
H. JENSEN
J. R. BALSLEY, JR.
By   M. O. Hayes
Attorney

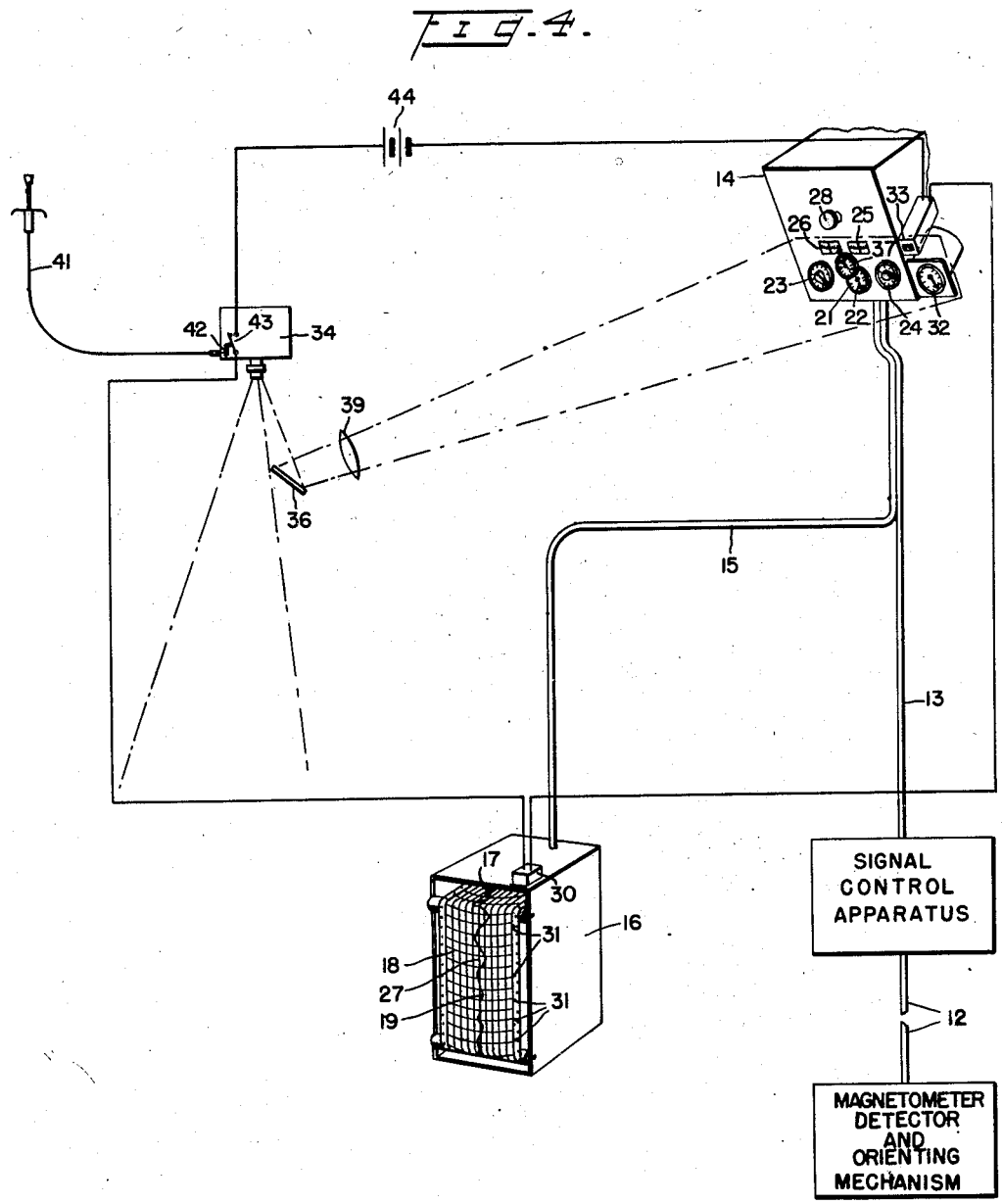

Patented Sept. 23, 1952

2,611,803

UNITED STATES PATENT OFFICE 2,611,803

METHOD AND APPARATUS FOR CONDUCTING GEOPHYSICAL SURVEYS

Lynn H. Rumbaugh, Washington, D. C., Homer Jensen, Philadelphia, Pa., and James R. Balsley, Jr., Arlington, Va.

Application July 10, 1946, Serial No. 682,518

6 Claims. (Cl. 175—182)

(Granted under the act of March 3, 1883, as amended April 30, 1928; 370 O. G. 757)

This invention relates generally to methods and apparatus for measuring magnetic anomalies of geological origin and more particularly to a new and improved method and apparatus for conducting geophysical surveys from an aircraft in flight wherein a standard Navy Magnetic Airborne Detector, designated AN/ASQ-3A and referred to hereinafter as MAD, and certain photographic apparatus associated therewith, respectively are adapted to measure and continuously record anomalous deviations in the earth's magnetic field and to permanently fix and record ground positions corresponding thereto.

The earth's magnetic field varies regionally from about 25,000 gammas near the equator to about 70,000 gammas near the magnetic poles, one gamma being equal to $10^{-5}$ oersted which is the unit of magnetic field intensity. Locally, however, the variations in the earth's magnetic field are usually much smaller and depend upon the local magnetic structure of the earth, principally upon the amount of magnetite-bearing rock present.

In conducting geophysical surveys, maps of the magnetic rock formations are prepared from data obtained from measurements of the earth's magnetic field by use of a magnetometer, and from such maps, the formations of related structures are deduced. In oil regions, for example, the magnetic rocks are usually buried deeply beneath sediments of relatively low and homogeneous magnetic permeability, and the field intensity variations measured by a magnetometer are characteristically smooth and of low gradient, being only a few gammas per mile in some cases. In other regions, rocks of widely varying permeability lie near the surface and gradients of many thousands of gammas per mile may be measured.

Magnetic anomalies of non-geological origin due to the presence of magnetic objects such, for example, as steel tanks, fences, rails, pipes, and other ferrous objects normally associated with urban or metropolitan areas also produce variations in the field intensity measured by a magnetometer. Theoretically, it is possible for a distribution of such local magnetic material to indicate falsely the existence of a large magnetic structure of geological origin. Such magnetic irregularities frequently make ground surveys unreliable or impossible in many developed areas. However, such anomalies attenuate rapidly with altitude and usually have little effect on an airborne magnetometer.

Heretofore, geophysical surveying on a large scale has been conducted by ground crews who make magnetometer measurements along predetermined survey lines and at predetermined points or stations along each line. The stations are set up successively by the crews and hence at time intervals, and the number of stations to be used in any case is controlled by the natural barriers and obstacles confronting the operator and the skill with which he may cover the ground between the stations and make the measurements thereat in the allotted time. In making the measurements, he must correct for temperature effects and for diurnal variations with extreme care, or his measurements become worthless.

From the point-by-point surveys thus afforded by this method, isomagnetic contours are prepared. However, an important loss of detail occurs between the points or stations of measurement as only chance will place these stations at the significant peaks along the contours. Moreover, the spurious variations in field strength due to local magnetic bodies at the points of measurement cause each measurement to be viewed with suspicion unless it appears consistent with measurements at other points.

The difficulties of conducting surveys according to this method may best be appreciated through consideration of the following example. Assuming that an anomaly of 25 gammas in a total field of 50,000 gammas with 2000 feet between peaks is to be measured, the ground operator must make his curve or contour from measurements made at a number of stations over a period of hours, with the significance of his data lying in the differences between independent measurements whose limits are approximately 50,000 and 50,025 gammas. While he is making these measurements, the earth's field may vary by more than twice the twenty-five gammas he is trying to detect, and he must take this into account by application of an empirical formula which he hopes applies to that day, or otherwise by having a base station run a control curve with which he can check. Accordingly, it will be appreciated that a precision in the corrected measurements better than one part in fifty thousand may not be expected from this method of survey.

According to the method and apparatus of the present invention for conducting geophysical surveys from an aircraft in flight, the aforementioned MAD is adapted to provide a continuous record trace corresponding to space changes in the total value of the earth's magnetic field as the aircraft moves along a predetermined traverse, and to include a control box having dials for adjusting the sensitivity or full scale deflection of the pen recorder providing the record trace and for changing the value of the center or base line of the recording chart.

A radio altimeter and an electric number counter are associated with the control box, and a conventional edge-marking device, adapted to be operated in synchronism with the number counter as each photograph of the terrain is taken by the aforementioned photographic apparatus, is operatively associated with the recorder to edge-mark the chart thereof.

The photographic apparatus includes a camera adapted to photograph selected check points on the ground disposed along the traverse and an optical system adapted to split the field of view of the camera and superimpose on the film adjacent the image of the terrain thereon, images of the control dials, altimeter and number counter, thereby to indicate on the photographic record at the time each picture of the terrain is taken, the degree of sensitivity of the MAD, the magnetic value of the base or center line of the recording chart, the height of the aircraft above the ground, and the number shown on the electric counter.

In the use of this apparatus, the aircraft is caused to move along a systematic series of adjoining and transverse traverses at each of several different altitudes. The record trace is produced continuously during the course of each traverse and, at selected points therealong, composite photographic records of the terrain and control box readings are produced simultaneously, these records being correlated with the record trace by the edge marks on the recorder chart. Thereafter, by plotting the relationship between the variations in the magnetic field strength and the ground positions corresponding thereto, it is possible to draw isomagnetic contours from which logical inferences and accurate quantitative deductions as to the nature of the substrata can be established.

Thus, magnetic surveys according to this method may be conducted rapidly regardless of difficulties of terrain and with an operating crew comprising considerably fewer members, a three-man crew in an aircraft, for example, being capable of covering from thirty to one hundred times the traverse of an equivalent ground crew in the same unit of time.

Moreover, the air surveys according to this method are continuous rather than point-by-point as in the case of the aforedescribed ground surveys, and thus give value to even the most rapid reconnaissance and provide a wealth of fine detail in intensive surveys which cannot be obtained from point-by-point measurements.

Furthermore, by reason of the rapid attenuation of small anomalies of non-geological origin with altitude, an aerial survey is more certainly related to actual geological structure than a ground survey. Also, by making traverses at different altitudes, positive information as to the nature, magnitude and depth of the disturbing geological structure may be obtained, and the choice of altitude permits the geophysicist to select the best level for seeking the signature of the type of anomaly he is studying. In some cases of small anomalies, the altitude may be as small as two hundred feet, and in other cases where basement structures are being investigated the altitude may be many thousand feet.

In addition to the foregoing advantages, the MAD provides a maximum sensitivity of twenty-five gammas full-scale, and use thereof at altitudes in which anomalies of non-geological origin become obscured, makes it possible for the geophysicist to give significant consideration to small anomalies of geological origin which heretofore would have been treated only tentatively, if at all. In measuring the aforeassumed anomaly of 25 gammas, for example, at an altitude of 300 feet the field strength may be reduced one-third and the distance between peaks increased one-seventh to make the anomaly 16 gammas with peaks separated by 2300 feet. If the aircraft is flying 150 feet per second, the field variation of 16 gammas is recorded in 15 seconds. Thus, by reason of the relatively short time required to make the traverse, diurnal variations are substantially avoided in the measurement of the field.

An object of the present invention is to provide a new and improved method and apparatus for conducting geophysical surveys.

Another object is to provide apparatus operable from an aircraft in flight for measuring and recording anomalous deviations in the earth's magnetic field and for permanently fixing and recording ground positions corresponding thereto.

Another object is to correlate the continuous record trace obtained from an airborne magnetometer with ground positions corresponding thereto by producing simultaneously at selected points along a predetermined line of flight, composite photographic records of the terrain, the sensitivity of the magnetometer, the magnetic value of the base line of the recording chart, the altitude of flight, and a number identifying each photographic record with the point corresponding thereto on the record trace.

A further object is to provide a new and improved geophysical mapping tool which provides continuous measurements of the earth's magnetic field along predetermined survey lines at different altitudes whereby broad and fine details of the field and measurement of the vertical variation therein may be obtained.

An additional object resides in the provision of a geophysical mapping tool which avoids in the use thereof the difficulties confronting ground crews and arising from impediments in the terrain, local magnetic disturbances and diurnal variations.

Still other objects, features and advantages of the present invention are those implied from or inherent in the novel combination and arrangement of parts wherein the aforedescribed method of the invention is practiced, the foregoing being accomplished by the specific apparatus and in the specific manner hereinafter more fully to appear, reference being had to the accompanying drawings wherein:

Fig. 2 is a plan view of a record chart illustrating the form of record trace obtained in the use of the apparatus of the present invention;

Fig. 3 is a plan view of a portion of the composite photographic record produced by the camera employed in the apparatus; and Fig. 4 is a diagrammatic view of the complete apparatus which is supported in part in the aircraft and in part in the aerodynamic body illustrated in Fig. 1.

Figure 1:
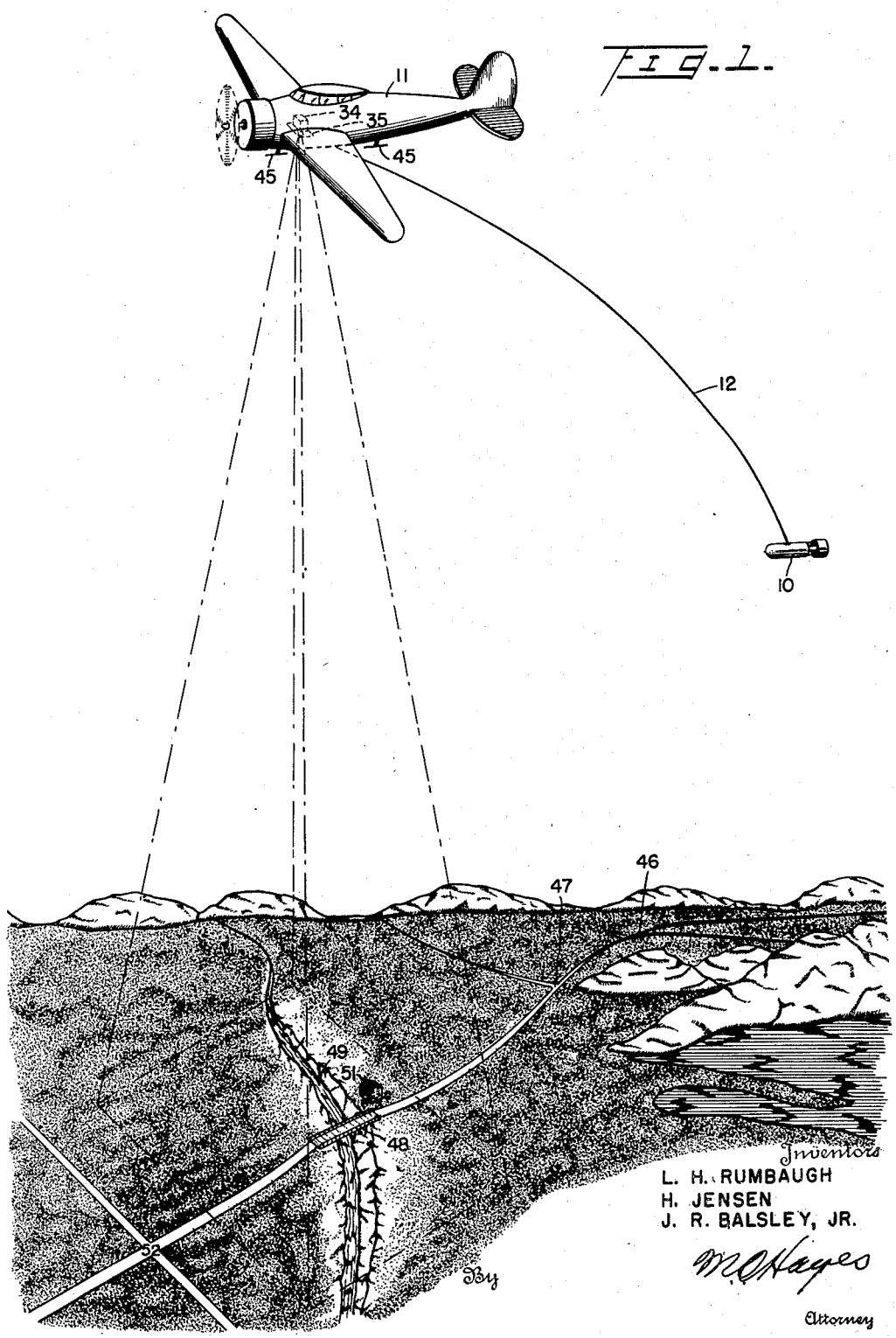
Fig. 1 is a diagrammatic view of an aircraft and an aerodynamic body towed thereby and suitable for use with the apparatus of the present invention.

Referring now to the drawings for a more complete understanding of the invention, the MAD equipment shown diagrammatically in Fig. 4 comprises a magnetometer detector and an orienting mechanism therefor, which components are mounted within the aerodynamic body 10, Fig. 1. The body or bird 10 is of non-magnetic construction and is towed from the aircraft 11 at a distance therefrom by a cable 12 so as to avoid the effects of the magnetic field of the aircraft, a winch and associated apparatus, not shown, preferably being employed to lower the bird from a cradle therefor, also not shown, on the underside of the aircraft to a position as far behind as below the point of suspension of the bird on the aircraft.

Use of the bird permits the use of almost any aircraft of suitable speed and capacity regardless of the amount of steel which it may contain, and the installation of the MAD and photographic apparatus therein is largely a matter of establishing connections between the components of the apparatus and adapting and mounting the same within the aircraft. The bird, however, must be aerodynamically stable in flight in order to avoid the generation of spurious signals in the magnetometer detector due to inability of the orienting mechanism to respond to sudden changes in position of the bird. A suitable type of bird for this purpose is disclosed and claimed in the copending application of Gerhard O. Haglund for Aerodynamic Body, Serial No. 671,341, filed May 21, 1946, now Patent No. 2,551,596.

Towing cable 12 is a strain-cored multi-conductor cable and serves to electrically interconnect the magnetometer detector and orienting mechanism with the signal control apparatus therefor carried within the aircraft 11, whereby a detecting element in the bird is adapted to be maintained in alignment with the direction of the earth's magnetic field under control of the signal control apparatus.

The signal control apparatus also operates to produce electrical signals which correspond to space changes in the total value of the earth's magnetic field sensed by the aforesaid detector element, and these signals are applied by way of cable conductor 13, control box 14, and cable conductor 15 to a recording milliammeter 16 to drive the pen 17 with respect to its coacting chart 18, whereby a record trace 19 is produced on the chart. Recorder 16 preferably is of the E-A type of spring-driven recorder well known in the art.

The electrical signals produced by the signal control apparatus also operate a galvanometer 21 whereby the pointer 22 of the galvanometer indicates in relation to the scale associated therewith, the corresponding movements of the recording pen 17.

The control box 14 also includes a sensitivity adjusting dial 23 by means of which the full scale deflection of the recorder pen 17 from edge to edge of the chart may be controlled, the dial being provided, for example, with sensitivities of 50, 500 and 5000 gammas. The control box further includes a plurality of dials 24, 25 and 26 which control means for nulling out predetermined portions of the total field at the detector element and thus determine the magnetic value of the center or base line 27 of the recording chart.

Dials 25 and 26 are operatively interconnected and adapted to be controlled from the same adjusting knob 28, these dials being graduated so as to read in ranges of field strength such, for example, as 0 to 2,200 gammas in 22 steps of 100 gammas each and 0 to 100 gammas in 100 steps of 1 gamma each respectively. Dial 24, which is referred to as a latitude adjustment, is graduated so as to provide a range of field strength such, for example, as 0 to 45,000 gammas in 30 steps of 1,500 gammas each.

Thus, in a total field at the detector element of approximately 56,290 gammas, the nulling means may be arranged to null out permanently 30,000 gammas in the field, dial 24 may be adjusted to null out 25,000 gammas, dial 25 may be set to null out 1,200 gammas, and dial 26 may be set to null out 90 gammas whereby the recorder pen 17 assumes a position on the base line 27 of the recorder chart 18. Thereafter, upon variation in the field at the detector element, the pen moves to the right or the left according to increases or decreases in the value of the field from said base value of 56,290 gammas. Occasionally, it becomes necessary to adjust the control box dials 23 through 26 to keep the pen on scale on the chart, and at such time a break indicated at 29 on the chart, Fig. 2, occurs in the trace 19.

The aforedescribed MAD equipment and the operation thereof are described in detail in the operating and maintenance instructions therefor furnished to the Navy and identified as AN-08-10-252 and CO-AN-08-20-14 respectively, and reference may be had thereto for further details of construction and operation. These reports are available in photostat or microfilm form at the Office of Technical Services, Department of Commerce, the report numbers designating these reports being PB-27559 and PB-27560 respectively.

A conventional electrical edge-marking device 30, usually provided for use with recorders of the aforedescribed type, is cooperatively employed with recorder 16 and is adapted upon each operation thereof to produce an edge-mark 31 on the recorder chart 18.

An altimeter 32 and an electric register or number counter 33 are secured to the side of control box 14 so as to be included in the split field of view of a camera 34 which is mounted for vertical photography of the terrain from the aircraft 11 through a suitable port 35 therein, the control box being inverted and located within the aircraft in a convenient position adapted to facilitate adustments of the controls thereof and to bring the altimeter, number counter, and control box dials into the same focus on the film.

The field of view of the camera is split by means of an adjustable front-surfaced mirror 36 which is so positioned as to superimpose the images of the altimeter, number counter, control box dials, and of a watch 37 secured to the face of the control box adjacent to each image of the terrain recorded on the film 38 of the camera, as illustrated in Fig. 3. A single element lens 39 is inserted in the split field of view to bring the control box images into the same infinite focus as is required for the terrain portion of the composite picture recorded on the film.

Camera 34 may be of any type suitable for the purpose such, for example, as a Sept camera which is adapted to make 250 ¾ by 1 inch photographs on a single roll of 35 millimeter film with a single winding of its spring motor, and which is capable of automatic cocking and winding operations.

A five-foot release cable generally designated by the numeral 41 is employed to operate the shutter of the camera, and a cam 42 secured to the cable is adapted to close a switch 43 each time the shutter is actuated to expose a frame of the film.

Switch 43 controls a simple series circuit which includes a battery 44, the number counter 33 and edge-marking device 30, thereby to advance the number counter and edge-mark the record tape simultaneously as each picture of the terrain is taken whereby the control box and altimeter data corresponding to a particular ground position and appearing as a composite photographic record therewith may be correlated with the corresponding point on the record trace by the edge-mark on the chart which corresponds to the numeral appearing in the composite record.

The number counter 33 may be any one of the conventional register counters well known in the art such, for example, as the Western Electric type 12F. Altimeter 32 may be any suitable type of radio altimeter such, for example, as the RCA altimeter, RT-7/APN-1, which provides two ranges of 0 to 400 feet and 0 to 4000 feet, and includes two antennae 45 which may be mounted beneath aircraft 11 in the manner indicated in Fig. 1.

The radio-altimeter indicates the altitude of the aircraft above the ground surface and thus provides information relating to the variation of the field with altitude above the ground surface, this information being an important part of the information required in magnetic surveys.

The watch 37 serves as a means for checking or verifying the intervals between edge-marks on the record tape and between consecutive numbers on the number counter, the numbers being written adjacent their corresponding edge-marks during the course of operation to simplify the analysis of the data, as will presently appear from the following statement of the use of the method and apparatus of the present invention in conducting geophysical surveys.

Most of the areas to be surveyed will have been photographed from the air by conventional mapping cameras. Flight paths are laid out on these photographs, and the pilot thereafter attempts to follow the flight paths as closely as possible. The record camera is operated from a seat with good visibility, and exposures are made at frequent intervals, as the aircraft passes over identifiable landmarks such, for example, as the road intersections 46 and 47, the bridge 48, river 49, building 51, and the road intersection 52.

From time to time, and specifically at the beginning and end of a traverse, the operator makes a notation on the record tape opposite the proper edge-mark thereon, of the register number then showing on the number counter. The operator also makes a record in his log book giving a brief notation of the traverse being flown, and its terminal numbers.

After the traverses in a predetermined area have been completed and the film used therefor has been developed, the next step is to analyze and correlate the data which has been recorded on the record trace and composite photographic record.

The first step in the analysis of the data is to determine the ground distances between terrain photographs. This is accomplished by comparing the individual frames of the film strip with the aerial maps upon which the flight paths were laid out, a film viewer preferably being employed for this purpose. The frames appear as points on the aerial maps, and each identifiable point thereon is encircled and numbered with the register number appearing on the frame correponding thereto. The film strip is examined as a negative to save the expense and delay of making a positive print.

Since the scale of the master mapping photographs varies from sheet to sheet, section lines, or other landmarks defining distances on the aerial maps, are used to establish the length of a mile on the maps. A suitable practice is to make the scale of the final signature or curve two inches to the mile.

After all possible points have been identified and located on the master photographs, they are laid out in a line on graph paper in their true distance relation as indicated on the aerial map.

After the distances have been established on the graph paper, the film strip is re-examined and the instrument data transferred to the margin of the tape opposite the appropriate edge-marks, as shown by the register numbers, the unnumbered edge-marks on the record tape having been numbered at any time after the traverses have been completed.

The final two steps comprise translating the discontinuous curve on the record tape, which curve contains values in terms of curvilinear coordinates, into a continuous curve containing values in terms of rectangular coordinates, and correcting for distance variations on the tape. The curve on the record tape is discontinuous wherever the base reading of the control box has been changed, as previously noted, and the distance scale varies with the wind and speed of the plane.

To avoid the tedium of point-by-point transcribing of the curve to rectangular coordinates, the final two steps are preferably performed by a scaling or transcribing device such, for example, as a device wherein an Esterline-Angus tape viewer is mounted on wheels and a track to provide a tape carrying cart, and a wheeled wooden cart, adapted to be driven by a Variac controlled A. C.-D. C. motor through a great speed reduction including a pinion and a rack driven thereby, is arranged to carry the copy paper upon which the translated curve is to appear, the aforesaid graph paper being laid along the copy paper to set the distance scale thereof.

Bars extend from the backs of the carts to an interconnecting lever having a movable fulcrum which travels in a slot aand can be set for any desired ratio.

To start, the tape cart is moved into a position wherein the slot in which the fulcrum travels is parallel to the lever whereby the two carts have the same positions at the origin of the curves, no matter where the fulcrum is anchored.

The tape is now moved on the cart until a selected origin point is opposite a pointer which marks an edge-mark position corresponding to the position of the stylus, to be mentioned hereinafter. Now the tape cart is moved forward until the first edge-mark thereon is next to the pointer. The fulcrum lock on the lever is then loosened, and the fulcrum slid until the correspondingly numbered point on the graph paper is opposite its pointer. Thereafter, both carts are returned to the origin position, and copying operations are begun, similar adjustments of the fulcrum being made for each successive edge-mark on the record tape as changes in the ratio of tape interval to graph interval occur.

When the section of the record tape has been copied, a new length of tape is run into place on the cart, with the last edge-mark on the previous section now opposite the pointer. Similarly, a new section of copy paper is moved into place, with the last numbered point of the graph paper for the previous section of copy paper now opposite its pointer. This process is repeated until the traverse is completed.

The aforementioned copying operations are accomplished by a pantograph mechanism which forms the remaining portion of the scaling device. This mechanism comprises a copy pen carried by an arm which is movable along a pen rod. The pen rod on the opposite end thereof makes a bronze-cord connection with the arcuate end of a pivoted arm which, in turn, carries a stylus having a radius corresponding to that of the pen arm 17 of recorder 16.

Where a discontinuity of the recorder trace occurs, the arm of the copy pen is moved along the pen rod a distance corresponding to the change made in the record trace, and the copy curve thereafter is continued along its line, with only a slight break therein representing the time involved in making the change in setting.

From the copy curves, thus produced by the foregoing steps isomagnetic contours are prepared from which inferences concerning the nature of the substrata therein may be established, and by correlating the isomagnetic contours corresponding to traverses made at different altitudes with the ground positions corresponding thereto, data may be obtained from which accurate quantitative deductions may be made concerning the nature of the substrata.

From the foregoing, it should now be apparent that a method and apparatus for conducting geophysical surveys has been provided which is well adapted to fulfill the aforestated objects of the invention, and while the invention has been described in particularity with respect to specific methods and apparatus which give satisfactory results, it will be understood by those skilled in the art to which the invention most nearly appertains that various changes and modifications may be made without departing from the spirit and scope of the invention and it is intended, therefore in the appended claims to cover all such changes and modifications.

The invention herein described and claimed may be manufactured and used by or for the Government of the United States of America for governmental purposes without the payment of any royalties thereon or therefor.

What is claimed as new and desired to be secured by Letters Patent of the United States is:

1. A method of conducting a geophysical survey which comprises the steps of flying an aircraft and magnetometer apparatus associated therewith along a predetermined traverse, measuring the total magnetic field, producing within the aircraft a continuous record trace corresponding to space changes in the absolute or static value of the earth's total magnetic field sensed by a detecting element of the magnetometer apparatus adapted to be maintained in alignment with the direction of the earth's magnetic field as the aircraft moves along the traverse, producing at each of a plurality of spaced intervals along the traverse a composite photographic record of images of an altimeter dial indicative of the height of the aircraft above the terrain, of control dials indicative of the sensitivity of the magnetometer apparatus and of the magnetic value of the base or center line of the recording chart upon which the record trace appears, of the serial number appearing on a register counter, and of the terrain beneath the plumb line of the aircraft, and simultaneously edge-marking the record chart and advancing the numbers of the register counter as each photographic record is produced.

2. A method of geophysical surveying which comprises the steps of laying out flight or survey lines on aerial maps of an area to be surveyed, flying an aircraft and magnetometer apparatus associated therewith along each of said flight lines at a predetermined height above the surface of the terrain, measuring the total magnetic field, producing within the aircraft a continuous record trace on curvilinear coordinates corresponding to the space changes in the static value of the earth's total magnetic field as the aircraft moves along each of said flight lines, producing simultaneously at each of a plurality of spaced intervals along each of said flight lines a composite photographic record of images of an altimeter dial indicative of the height of the aircraft above the surface of the terrain, of control dials indicative of the sensitivity of the magnetometer apparatus and of the magnetic value of the base line of the recording chart upon which the record trace appears, of a serial number appearing on a register counter, and of the terrain beneath the plumb line of the aircraft, simultaneously edge-marking said recording chart and advancing the numbers of said register counter as each of said photographic records is produced, locating points on the aerial maps corresponding to the terrain pictures appearing on the photographic records to determine the true distances between the edge-marks corresponding to said points, transferring the dial data on the photographic records to the recording chart at the edge-marks thereon corresponding respectively to the photographic records, and translating the record trace into a continuous copy trace which converts the curvilinear coordinates of the record trace to rectangular coordinates with total magnetic field plotted against a uniform scale of distance which corrects for distance variations between the edge-marks and the corresponding points on the aerial maps.

3. In apparatus of the character disclosed for conducting geophysical surveys from an aircraft in flight, the combination of means including a recorder for producing a record trace indicative of variations in the earth's total magnetic field as the aircraft moves along a predetermined traverse and also including a control box having dials for indicating and adjusting the sensitivity of said trace producing means and the magnetic value of the base or reference line of the trace, an electrical number counter, an electrical device for edge-marking the chart of the recorder, an altimeter having an indicating dial, means for producing at spaced intervals along the traverse composite photographic records each including images of the terrain, of a serial number appearing on said counter, of the altimeter dial, and of the control box dials, and a control circuit for simultaneously actuating said edge-marking device and said number counter as each of said photographic records is produced.

4. In apparatus of the character disclosed for conducting geophysical surveys from an aircraft in flight, the combination of means including a recorder for producing a record trace indicative of space changes in the absolute or static value of the earth's total magnetic field as the aircraft moves along a predetermined traverse, an altimeter having an indicating dial, an electric number counter, a camera having a film adapted to receive thereon in successive order a plurality of images of the terrain beneath the plumb point of the aircraft, said trace producing means including a control box having a plurality of dials for adjusting and indicating the full scale deflection of the pen of said recorder with respect to the cooperating chart thereof and the magnetic value of the base or center line of the recording chart, an electrical device for edge-marking the recording chart, a first optical element adapted to reflect images of said altimeter dial, of a serial number appearing on said counter, and of said control dials onto the film of said camera adjacent each of said terrain images thereon, a second optical element interposed between said first optical element and said control dials, number counter and altimeter for causing the images thereof to be formed on the film in the same focal plane as the image of the terrain thereon, and a control circuit for simultaneously actuating said edge-marking device and said counter as each photograph is recorded by the camera.

5. In apparatus of the character disclosed for conducting geophysical surveys from an aircraft in flight, the combination of magnetometer apparatus including a recorder for producing a record trace corresponding to space changes in the earth's total magnetic field as the aircraft moves along a predetermined traverse, an altimeter having an indicating dial, an electric number counter, said magnetometer apparatus including a control box having a plurality of dials for adjusting and indicating the sensitivity of the magnetometer apparatus and the magnetic value of the base line on the recording chart of the recorder, an electrical device for edge-marking said recording chart, a camera having a release cable for actuating the shutter thereof and mounted within the aircraft for vertical photography of the terrain, optical means adapted to split the field of view of the camera and superimpose on the film thereof adjacent the image of the terrain thereon images of the control dials, altimeter dial, and number counter for each actuation of the shutter, and a control circuit adapted to be actuated by said release cable for simultaneously actuating said edge-marking device and advancing the numbers on said number counter.

6. In apparatus of the character disclosed for conducting geophysical surveys from an aircraft in flight, the combination of an aerodynamic body adapted to be towed in stable flight from the aircraft, a self-oriented total field magnetometer carried by said body and having a field sensing element adapted to be maintained in alignment with the direction of the earth's magnetic field, means including a recorder within the aircraft and adapted to produce a record trace indicative of space changes in the static value of the earth's total magnetic field sensed by said magnetometer element as the aircraft moves along a predetermined traverse, said trace producing means including a control box having dials for adjusting and indicating the full scale deflection of the pen of the recorder with respect to the recording chart thereof and the magnetic value of the base line of the chart, an electrical device for edge-marking the recording chart, an electrical number counter, a radio altimeter having an indicating dial, photographic apparatus operable at will for producing at selected points along the traverse composite records of images of the control dials, altimeter dial, number counter, and terrain below the plumb line of the aircraft, and a control circuit adapted to be actuated by said photographic apparatus upon operation thereof for simultaneously actuating said number counter and said edge-marking device.

LYNN H. RUMBAUGH.
          HOMER JENSEN.
          JAMES R. BALSLEY, Jr.

REFERENCES CITED

The following references are of record in the file of this patent:

UNITED STATES PATENTS

| Number | Name | Date |
| --- | --- | --- |
| 1,331,978 | Brock et al. | Feb. 24, 1920 |
| 1,585,484 | Gasser | May 18, 1926 |
| 1,658,537 | Reinhold | Feb. 7, 1928 |
| 1,912,485 | Kothny | June 6, 1933 |
| 2,167,630 | Bazzonie et al. | Aug. 1, 1939 |
| 2,338,991 | Arnold | Jan. 11, 1944 |
| 2,406,870 | Vacquier | Sept. 3, 1946 |
| 2,424,772 | Rieber | July 29, 1947 |
| 2,428,034 | Nichols et al. | Sept. 30, 1947 |
| 2,468,554 | Hull | Apr. 26, 1949 |
| 2,518,513 | Wyckoff | Aug. 15, 1950 |
| 2,555,209 | Vaxquier | May 21, 1951 |

FOREIGN PATENTS

| Number | Country | Date |
| --- | --- | --- |
| 319,867 | England | Oct. 3, 1929 |

OTHER REFERENCES

Heiland, "A. I. M. E. Transactions," 1932, pp. 213–214.

Heiland, "Engineering & Mining Journal," December 1935, pp. 609–610.

Logachev, "Geophysics," April 1946, pp. 135–147.

"The Airborne Magnetometer," Geophysics, July 1946, pp. 321–334.